Aug. 4, 1964  V. H. ASKE  3,142,990
ACCELEROMETER
Filed Feb. 27, 1959  2 Sheets-Sheet 1

INVENTOR.
VERNON H. ASKE
BY Roger W. Jensen
ATTORNEY

Aug. 4, 1964  V. H. ASKE  3,142,990
ACCELEROMETER
Filed Feb. 27, 1959  2 Sheets-Sheet 2

*INVENTOR.*
VERNON H. ASKE
BY Roger W. Jensen
ATTORNEY

//  # United States Patent Office 3,142,990
Patented Aug. 4, 1964

3,142,990
ACCELEROMETER
Vernon H. Aske, Hopkins, Minn., assignor to Minneapolis-Honeywell Regulator Company, Minneapolis, Minn., a corporation of Delaware
Filed Feb. 27, 1959, Ser. No. 796,147
5 Claims. (Cl. 73—490)

This invention pertains to an accelerometer means and more specifically to a double integrating accelerometer.

Heretofore various single and double acceleration devices and systems have been proposed. The double integration of an acceleration signal is a necessary function of various systems such as, for example, an inertial navigation system wherein the acceleration of the craft along a certain axis is sensed. A single integration with respect to time of acceleration produces a signal indicative of the velocity of the craft along the axis, and a double integration of acceleration produces a distance signal or a signal indicative of the distance traveled by the craft along the axis. Generally speaking it is unsatisfactory from a standpoint of accuracy to merely obtain an acceleration signal and then use an electronic network integration means for performing the double integration. The inherent errors in the electronics associated with systems of this type will introduce such a great error into the final output that the system is not practical. Other integrating accelerometers have been proposed utilizing various mechanical configurations and which perform a single or a double integration. However, in all of these prior art devices it has been necessary to use slip-rings for conducting signals between a pair of relatively rotating parts. Some prior art double integrating accelerating accelerometers comprise in part gear means between relatively rotatable members and in addition some prior art double integrating accelerometers are subject to cross acceleration, that is, accelerations perpendicular to the axis along which the desired acceleration is to be sensed.

The present invention provides a double integrating accelerometer which includes no gears, slip-rings, or the like. The present double integrating accelerometer further is immune to cross acceleration. The present double integrating accelerometer is also free of the disadvantages associated with the prior art type of electronic integrating network.

The present invention comprises a container rotatably mounted on a support and adapted to contain a fluid. Motor means are provided for spinning the container about a rotational axis at a substantially constant angular velocity under normal conditions, that is when no acceleration is being sensed along the sensitive axis which is the rotational axis of the container. The accelerometer further includes float means contained within the container and adapted to be rotated therewith. Pickoff means are provided for sensing any relative longitudinal displacement between the container and the float means, the float means having a normal position along the rotational axis relative to the container in the absence of any acceleration along the sensitive axis. When an acceleration is detected there will be relative longitudinal displacement between the float and the container and the pickoff means described will produce a signal indicative of the sense and magnitude of the longitudinal displacement. Means are provided for varying the angular velocity of the container in accordance with the magnitude of the signal produced by the pickoff means. Additional means are provided for setting up a circulating fluid current within the container of a sense that will tend to rebalance or restore the float means to its initial position relative to the container, this restoring means being actuated by the change in angular velocity of the container. With the device thus far described the angular acceleration imparted to the container becomes a measure of the linear acceleration along the sensitive axis which initially displaced the float with respect to the container, the angular velocity of the container becomes proportional to the linear velocity, and the angular displacement of the container becomes proportional to the distance. Means are provided for sensing a change in angular velocity of the container and for comparing this with a reference signal indicative of the normal constant angular velocity of the container with the difference between these signals being applied to a counting means which is effective to provide the time integral between the difference of the actual angular velocity and the normal angular velocity. This means in effect provides a signal indicative of the distance traveled by the means upon which the accelerometer is mounted.

It is an object of this invention therefore to provide an improved accelerometer means.

Another object of the invention is to provide an improved double integrating accelerometer means.

Still another object of the invention is to provide a double integrating accelerometer means which is immune to cross-acceleration which eliminates the difficulties associated with gearing, slip-rings, and electronic integrating networks.

These and other objects of the invention will become apparent from a study of the accompanying specification and claims in conjunction with the drawing in which:

Figure 1:
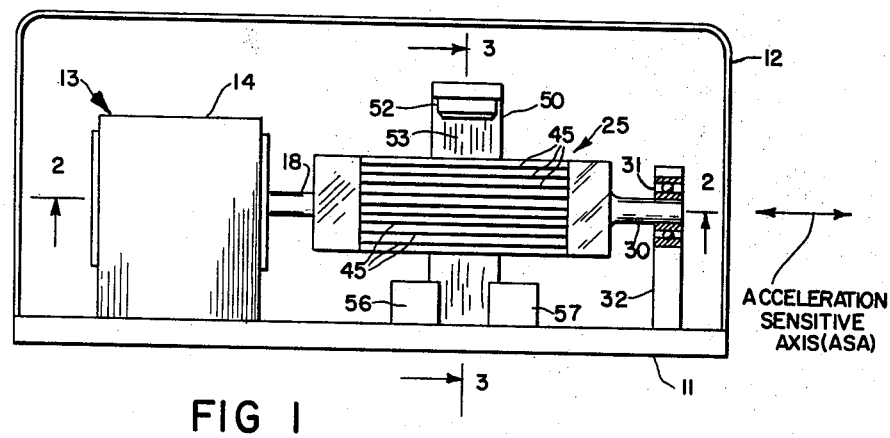
FIGURE 1 is a side view of the acceleration sensor of the present double integrating accelerometer means.

Referring now to FIGURE 1 reference numeral 10 generally identifies an acceleration sensor comprising a base or support member 11 having associated therewith a cover member 12. A motor generally identified by reference numeral 13 is mounted on support member 11. Motor 13 includes an outer housing 14 in which is mounted a stator unit 15 having associated therewith winding means 16 adapted when energized to produce a rotating flux field which co-acts with a rotor member 17. The rotor 17 is positioned within the central bore of the stator 15 and is mounted on a shaft 18 which in turn is mounted for rotation about a rotational axis by means including a pair of housing end members 20 and 21 which in turn have centrally positioned therein a pair of bearings 22 and 23. Energization of the winding means 16 of the motor means 13 then is effective to cause rotation of the rotor member 17 and its associated output shaft 18.

An acceleration sensing housing 25 generally comprises a hollow cylindrically shaped shell or container having an outer cylindrical shell portion 26 and a pair of end portions 27 and 28. An extension of the motor shaft 18 is attached to the end plate 27 of the sensor 25 and the other end of the sensor is connected through a shaft 30 which is supported for rotation in an anti-friction bearing means 31 which in turn is mounted in a bracket number 32 mounted on the support or base member 11. The bearing means 22, 23 and 31 collectively define the rotational axis for the rotor motor member 17 of the motor and the acceleration sensing housing 25.

The acceleration sensor housing 25 is characterized by having positioned therein an insert 35 having a central aperture 36 substantially aligned with the rotational axis of the sensor. The insert 35 has an external "square" threaded portion 37 having an axis which also is substantially aligned with the rotational axis of the sensor. A helical channel 38 is defined between the threaded portion 37 and the inside of the shell 26.

The hollow cylindrical shaped member or container 26 is adapted to be filled with a suitable fluid 39. A float means shown as a symmetrically shaped float member 40 is adapted to be positioned within the aperture 36 in the threaded insert 35 of the sensor 25. A pair of stop pin members 41 and 42 are positioned at the ends of aperture 36 and serve as a means limiting the freedom of movement of the float means 40 in the aperture 36 relative to the housing member 26.

The hollow cylindrical container 26, the threaded insert 36, and the fluid 39 are characterized by being substantially transparent or at least translucent with respect to the passage there-through of light. The float means 40, on the other hand, is characterized by being substantially opaque to the transmission of light.

The float means 40 and the fluid 39 are selected so that there will be the desired degree of floatation of the float means 40 with respect to the fluid.

On the outer periphery of the hollow cylindrically shaped container 26 are provided a plurality of longitudinally extending opaque lines or portions 45 (see FIGURE 1).

A bracket member 50 secured to the base or support 11 provides a means of positioning a source of light or light producing means 52 so that it is effective to direct a beam of light 53 through the hollow cylindrical member 26 substantially perpendicular to the first or rotational axis thereof defined by the bearings means 22, 23, and 31.

A pair of light sensitive signal producing devices 56 and 57 are mounted on the support 11 generally diametrically opposite the source of light 52. In other words the positioning of light sensitive devices 56 and 57 is such that they are on the opposite side of the hollow cylindrical member 26 from the light source 52. Light sensitive signal producing means 56 and 57 may be of any suitable type such as, for example, photo transistors. The signal producing means 56 and 57 are effective to produce unidirectional currents having a magnitude indicative to the amount of light impinging upon their sensitive surfaces.

Figure 4:
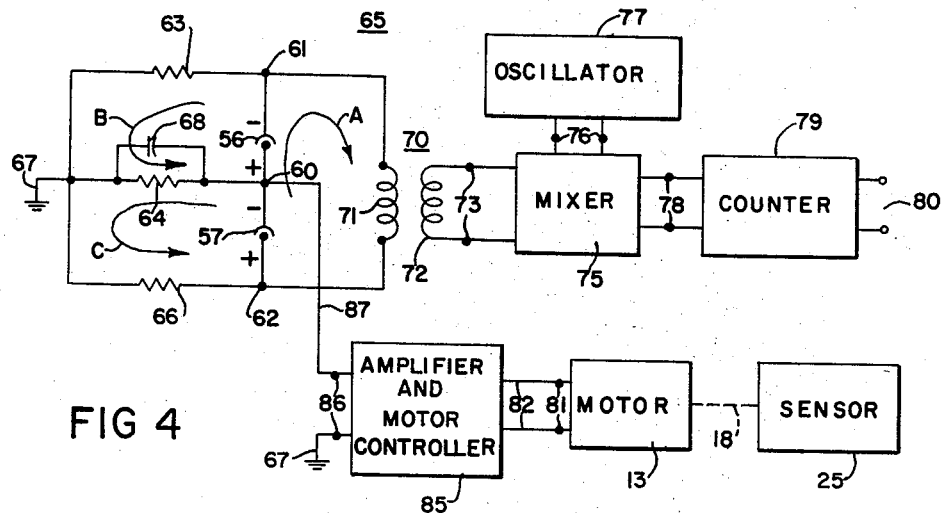
FIGURE 4 is schematic diagram of the accelerometer means.

The light sensitive signal producing means 56 and 57 are schematically shown in FIGURE 4. The units are connected electrically in series additive relationship, a junction point 60 being common to both devices 56 and 57, the other or uncommon terminals of devices 56 and 57 being identified by reference numerals 61 and 62 respectively.

Light sensitive signal producing means 56 and 57 form part of a network generally identified by the reference numeral 65. The network 65 has several loops and two distinct functions. The first function is to energize the motor means 13 driving the sensor 25 as a function of longitudinal displacement of the float 40 relative to the container 26 away from a normally centered position. The second function is to provide an output signal indicative of the angular velocity of the cylinder 26.

Three resistors 63, 64, and 66 are connected respectively between junction points 61, 60 and 62 to ground 67. Resistor 64 has connected in parallel therewith a suitable condensor member 68. A coupling transformer 70 is provided and comprises a primary winding 71 and a secondary winding 72. The primary winding 71 is connected to junction points 61 and 62 and the secondary winding 72 is connected to a first set of input terminals 73 of a mixer means identified in block diagram form in FIGURE 4 by the reference numeral 75. Mixer means 75 also has applied thereto through a second pair of input terminals 76 the output from a reference depicted as an oscillator means 77. The function of mixer means 75 may be considered analogous to a heterodyning means wherein the output of the device represents the difference in frequency between the two inputs. The output of the mixer means 75 is produced at a pair of terminals 78 and is indicative of any difference in frequency between the first input signal applied to terminals 73 from the coupling transformer 70 and the second signal received at terminals 76 from the reference or oscillator 77. A suitable means for counting the total number of oscillations of the output mixer means 75 is indicated as a counter mechanism 79 which is connected to the output terminals 78 of the mixer means 75.

The motor means 13 is shown in block diagram form in FIGURE 4 with a mechanical linkage 18 connecting it to the sensor mechanism 25. The motor means is shown provided with a pair of input terminals 81 which in turn are connected to output leads 82 of an amplifier and motor controller mechanism 85 having a pair of input terminals 86, one of which is grounded as at 67 and the other of which is connected through a suitable lead 87 to terminal 60 of the network 65.

*Operation*

In FIGURE 1 the acceleration sensitive axis is depicted by the double ended arrow ASA which also is the rotational axis of container 25 defined by bearings 22, 23, and 31. The acceleration sensing device 10 in operation would be mounted on the device such as an aircraft of which the acceleration, velocity, and distance were desired. The base 11 in some cases would be rigidly secured to the carrier vehicle or in other cases would be mounted on some moveable mechanism such as a stabilized platform for use in an inertial guidance system.

The amplifier and motor controller mechanism 85 provides the function of normally energizing motor means 13 at such a level so as to drive the sensor mechanism 25 with its cylinder 26, etc. at a constant angular velocity. Thus, in the absence of any acceleration along the ASA, motor means 13 and sensor 25 rotate at a constant angular velocity. At this time the float means 40 is symmetrically positioned within the aperture 36 of the insert 35 of the rotating assembly. Since the float member 40 is less dense than the fluid 39 the spinning of the assembly 25 assures that the axis of float 40 will be substantially coincident with the rotational axis of the rotating assembly. This is due to the centrifugal force produced by the heavier fluid 39 acting on the float 40. The float 40 in addition is symmetrically positioned with respect to the photo-cells 56 and 57. The co-action between the light sensitive signal producing means 56 and 57, the float 40, and the source of light 52 and a beam of light 53 is such that at this normal position of float 40 relative to the cylinder 26 the float 40 casts a shadow on the signal producing means 56 and 57 of equal amounts. Stated otherwise, equal amounts of light at this normal position of float 40 relative to container 26 are directed against the light sensitive surfaces of the signal producing means 56 and 57. Since the signal producing means 56 and 57 are receiving equal amounts of light it follows that they are producing output signals of substantially the same magnitude. Referring now to FIGURE 4 it will be observed that due to the inter-connection of the signal producing means 56 and 57 in a series additive sense that a current will flow through a path designated by the circulating arrow A which includes the pair of signal producing means 56 and 57 and the primary winding 71 of the transformer 70. Since the sensor mechanism 25 including the cylinder 26 is rotating at a constant angular velocity it will be understood that the longitudinal opaque lines or portions 45 will modulate the beam of light 53 so as to in effect interrupt the light falling on the light sensitive devices 56 and 57. The function of this is to produce pulses of output signals from signal producing means 56 and 57 instead of a steady state output signal. Thus in effect a varying energization of an alternating current nature is provided to the primary winding 71 and accordingly the transformer 70 is enabled to couple the alternating signal to the set of input terminals 73 of the mixer means 75. Thus the signal so applied to terminal 73 of mixer means 75 is indicative of the speed of rotation or angular velocity of the cylinder 26. It will be understood that the signal to mixer means 75 through terminals 73 will vary as the angular velocity of the rotating cylinder 26 varies due to the fact that there will be a greater or lesser number of interruptions of the light beam 53 through the co-action with the longitudinal lines or portions 45.

At the time when signal producing means 56 and 57 are producing equal signals, they cancel each other out as far as changing the energization to the motor means 13. To explain, two additional paths of current flow are depicted by the reference letters B and C. Current path B includes the signal producing means 56, resistor 63 and the parallel combination of resistor 64 and condenser 68. It will be noted for the arbitrary direction of current flow shown that the current through the parallel combination of resistor 64 and condensor 68 is from the direction of ground 67 towards junction point 60. The current path C includes the signal producing means 57, the parallel combination of resistor 64 and condenser 68, and resistor 66. It will be noted for the arbitrary polarities shown and for the resulting direction of current flow through path C that the current flowing through the parallel combination of resistor 64 and condenser 68 is from terminal 60 to ground 67 or in other words exactly opposite to that flowing through current path B. Since the signals produced by signal producing means 56 and 57 are equal it follows that by the proper choice of the resistors and other components in the circuit that the current flowing through path B will be equal and opposite to the current flowing through path C and that accordingly there will be no net difference of potential between junction point 60 and ground 67. Since the amplifier and motor controller means 85 is connected in effect between junction point 60 and ground 67 it follows that there is no control input to the controller unit at this time. Accordingly there will be no variation in the angular velocity of the motor means 13 and the sensor 25 as long as the float means 40 is at its normal position as shown in the drawing with respect to the remaining sensing apparatus including the cylinder 26 and the photocells 56 and 57.

Assume that an acceleration is imparted to the device 10 along the ASA so as to cause a relative longitudinal shifting of the float means 40 with respect to the cylinder 26. This will cause more light to be directed against one of the light sensitive devices 56 and 57 while less light is directed against the other. This will then set up an unbalance in current paths B and C so that a net difference of potential will exist between junction point 60 and ground 67. The action of condenser 68 is to average out the pulses of current flowing through the network so as to maintain a substantially constant difference of potential as an input to the amplifier and motor controller means 85. The signal so applied to the terminals 86 of the amplifier and motor control mechanism 85 will be of a sense and of a magnitude indicative of the sense and magnitude of relative longitudinal displacement between the float means 40 and the cylinder 26. The signal so applied will be effective to change the energization to the motor means 13 of the proper sense and of a magnitude so that the angular velocity of the motor means 13 and the rotating sensor mechanism 25 will be varied or changed from its normal angular velocity. The angular acceleration imparted to the rotating assembly including the sensor 25 so as to enable the rotating assembly to attain a new angular of velocity then becomes a measure of the linear acceleration along the ASA which initially displaced the float means 40 relative to the cylinder 26. The angular acceleration of the assembly causes a relative rotative motion between the fluid 39 and the cylinder 26. This relative rotation in combination with the thread means 37 then sets up a circulating fluid current of the fluid 39 in such a sense so as to flow around the spiral path 38 of the thread means 37 and thence through the aperture 36 of the insert 35. The direction of fluid flow is of such a sense so as to return the float means 40 back to its normal position with respect to the cylinder 26. In other words the force produced on the float member 40 is a function of the fluid flow which in turn is a function of the angular acceleration and this force then overcomes the force acting on the float 40 as a result of the initial acceleration along the ASA. A point of equilibrium will be reached at a new value of angular velocity for the rotating assembly as long as the acceleration along the ASA persists. It will be understood that for further changes of acceleration there will be corresponding changes of angular velocity of the rotating assembly so as to rebalance the float means 40 in the proper sense relative to the normal position thereof with respect to the cylinder 26.

As the angular velocity of the rotating assembly 25 was changed in response to the deviation of the float means 40 relative to the cylinder 26 the frequency of the signal applied to the input terminals 73 of the mixer means 75 accordingly changed. When the rotating assembly 25 was rotating at its normal angular velocity the output of the mixer means 75 was zero since the frequency of the input to terminals 73 was equal to the frequency of the input to terminals 76 from the reference means or oscillator 77. Since at this condition of normal angular velocity of the rotating assembly 25 the output of the mixer 75 as produced at terminals 78 thereof is zero the counter mechanism 79 produces no output signal. However, when there is a variation in angular velocity in the rotating assembly 25 in response to acceleration along the ASA the frequency of the input to terminal 73 of the mixer means 75 does change away from its normal value either above or below the value or frequency of the oscillator 77. Accordingly at this time there will be an output from the mixer means 75 indicative of the difference between the two inputs thereof where in effect is a measure of the angular velocity of the rotating assembly 25. More exactly the output of the mixer means 75 is a measure of the difference between the normal angular velocity of the rotating assembly 25 and the actual angular velocity. It will be understood that the angular velocity change is a measure of the velocity of the craft or time integral of the acceleration along ASA and that accordingly the counter means 79 over a period of time provides a time integral of the velocity signal or in effect a double integration of the acceleration along the ASA. It will be understood that suitable means will be provided for enabling the counter means 79 to discriminate between the output of mixer means 75 when the input to terminals 73 is at a higher frequency than the input from oscillator 77 as compared to the opposite case when the frequency of the input to terminals 73 is less than the frequency of the input to terminals 76.

The present system as thus far described has the advantages of no rotating gears or slip ring assemblies for its operation which eliminates the sources of error of the prior art double integrating acceleration means. In addition the float member 40 is quite immune to any cross accelerations or accelerations perpendicular to the ASA due to the fact that it is firmly held in its position in a radial sense with respect to the ASA due to the centrifugal force of the fluid 39 acting thereon produced by the normally constant angular velocity of the assembly. The change in angular velocity of the rotating assembly 25 (the angular acceleration) in response to the deviation of the float means 40 relative to the cylinder 26 as indicated is a measure of the linear acceleration along the ASA. The angular velocity of the rotating assembly then becomes a measure of the linear velocity. Also, as indicated, the time integral of the difference between the normal angular velocity and the new angular velocity becomes a measure of the distance traveled by the craft upon which the device 10 is mounted in response to the initial acceleration ASA. This distance signal is produced by the counter means 79 and appears at its terminals 80 as a distance signal.

Figure 2:
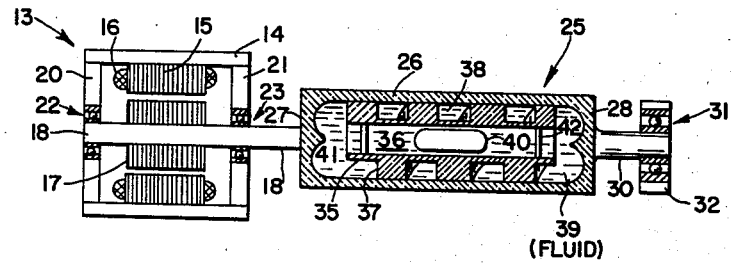
FIGURE 2 is a cross sectional view of the apparatus shown in FIGURE 1 as viewed along section lines 2—2 thereof.
Figure 3:
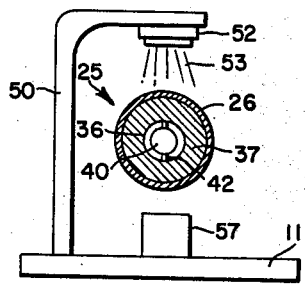
FIGURE 3 is a cross sectional view of the apparatus shown in FIGURE 1 as viewed along section lines 3—3 thereof.
Figure 5:
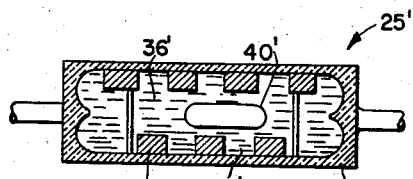
FIGURE 5 is a cross sectional view of an acceleration sensor somewhat modified from that shown in FIGURE 2.

A slightly modified configuration of the rotating sensor assembly 25 is depicted in FIGURE 5 wherein the device bears the reference numeral 25'. The difference between sensor 25 and sensor 25' is that the insert 35 in FIGURE 2 has a continuous central aperture 36 while the central aperture 36' in the device shown in FIGURE 5 is in communication with the helical channel portion 38' of the thread means. The function of the device shown in FIGURE 5 is the same as that described above in connection with the device shown in FIGURE 2.

Figure 6:
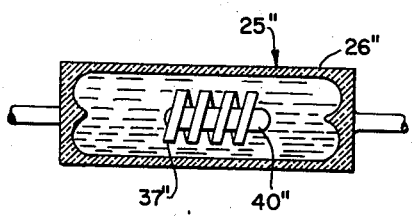
FIGURE 6 is a cross sectional view showing another modification of the acceleration sensor.

The apparatus depicted in FIGURE 6 is another alternative configuration which may be used for the present invention. Here the float means 40" has been provided with a threaded periphery 37" while the remaining portion of the sensor assembly 25" includes only a hollow cylindrically shaped housing 26" with no thread means being directly associated with the housing 26".

The function of the device depicted in FIGURE 6 is analogous to the function of the other configurations of the rotating sensor assembly. As the rotating assembly 25" has angular acceleration imparted to it caused by a change in the energization to the motor means driving the same there will be a relative rotation between the float assembly 40" with its thread means 37" with respect to housing 26" which will tend to impart a longitudinal motion to the float assembly as a result of the co-action between the thread means 37" and the fluid which will tend to restore the float means 40" back to its normal position relative to the light sensitive signal producing means associated therewith.

While I have shown and described a specific embodiment of this invention, further modification and improvements will occur to those skilled in the art. I desire to be understood, therefore, that this invention is not limited to the particular form shown and I intend in the appended claims to cover all modifications which do not depart from the spirit of the scope of this invention.

What I claim is:

1. A double integrating accelerometer comprising an internally threaded transparent container rotatably mounted on a support and adapted to contain a fluid; a symmetrically shaped opaque float within said container and adapted to be rotated therewith; means for spinning said container and its contents; optical pickoff means including means for directing a beam of light through said container and a pair of light sensitive signal producing means, said pickoff means sensing relative longitudinal displacement between said container and said float and producing a signal of a sense and magnitude indicative of the sense and magnitude of said displacement; and means connected to said pickoff means and to said spinning means for varying the angular velocity of said container as a function of said signal, said variation in angular velocity causing said threaded container to produce a flow of said fluid of a sense tending to cause relative longitudinal displacement between said container and said float.

2. A double integrating accelerometer comprising a support; a hollow transparent cylinder rotatably mounted on said support for unlimited rotation about a first axis; transparent thread means mounted within said cylinder with the axis thereof substantially aligned with said first axis, said thread means having a longitudinally extending central aperture; motor means connected to said cylinder and including winding means adapted when energized to enable said motor means to rotate said cylinder about said first axis; a plurality of longitudinally extending opaque lines on the surface of said cylinder; fluid means within said cylinder; a symmetrically shaped float member positioned in said aperture of said thread means and floated in said fluid means; a source of light mounted on said support and positioned so as to direct a beam of light through said cylinder substantially perpendicular to said first axis; a pair of light sensitive signal producing devices mounted on said support and positioned so as to receive normally equal amounts of light beamed through said cylinder when said float member is at a normal position along said first axis relative to said container and to receive unequal amounts of light when said float member shifts relative to said container along said first axis; network means including said signal producing devices; means including motor controlling means connecting said network means to said winding means, said motor means normally being energized to rotate said cylinder at a constant angular velocity about said first axis and said motor means being variably energized as a function of the output of said network means to change the angular velocity of said cylinder by an amount indicative of acceleration imparted to said accelerometer along said first axis; mixer means having a first input connected to oscillator means and a second input connected to said network means; and counter means connected to said mixer means to store the output of said mixer means, said mixer means having substantially zero output when said cylinder is being rotated at said constant angular velocity.

3. A double integrating accelerometer comprising a support; a hollow transparent container rotatably mounted on said support for unlimited rotation about a first axis; transparent thread means mounted within said container with the axis thereof substantially aligned with said first axis, said thread means having a longitudinally extending central aperture; motor means connected to said container and adapted when energized to enable said motor means to rotate said container about said first axis; a plurality of longitudinally extending opaque portions on said container; fluid means within said container; an opaque float member positioned in said aperture of said thread means and floated in said fluid means; means on said support for directing a beam of light through said container substantially perpendicular to said first axis; a pair of light sensitive signal producing devices mounted on said support and positioned so as to receive equal amounts of light beamed through said cylinder when said float member is at a normal position along said first axis relative to said container and to receive unequal amounts of light when said float member shifts relative to said container along said first axis; network means including said signal producing devices; means including motor controlling means connecting said network means to said motor means, said motor means normally being energized to rotate said container at a constant angular velocity about said first axis when said float is at said normal position and said motor means being variably energized as a function of said float shifting relative to said container away from said normal position change the angular velocity of said container by an amount indicative of said relative shifting and means connected to said network independent of said motor controlling means for comparing a signal indicative of the normal angular velocity of said motor means and a signal indicative of the actual motor angular velocity and for producing an output indicative of the time integral of the difference between said signal indicative of normal motor angular velocity and said signal indicative of actual motor angular velocity.

4. A double integrating accelerometer comprising a support; a hollow transparent container rotatably mounted on said support for unlimited rotation about a first axis; transparent thread means within said container with the axis thereof substantially aligned with said first axis, said thread means having a longitudinally extending central aperture; motor means connected to said container and adapted when energized to rotate said container about said first axis; a plurality of longitudinally extending opaque portions on the surface of said container; fluid means within said container; an opaque float member positioned in said aperture and floated in said fluid means; light producing means adapted to direct a beam of light through said container substantially perpendicular to said first axis; a pair of light sensitive signal producing devices mounted on said support and positioned so as to receive equal amounts of light beamed through said cylinder when said float member is at a normal position along said first axis relative to said container and to receive unequal amounts of light when said float member shifts relative to said container along said first axis; network means comprising said signal producing device, a first output characterized by having a sense and magnitude indicative of the sense and magnitude of said float shifting along said first axis relative to said container, and a second output characterized being indicative of the angular velocity of said container; means including motor controlling means connecting said first output of said network means to said motor means, said motor means normally being energized to rotate said container at a constant angular velocity about said first axis and said motor means being variably energized to change the angular velocity of said container by an amount indicative of relative axial displacement between said float and said container; mixer means having a first input connected to reference means and a second input connected to said second output of said network means; and counter means connected to said mixer means to store the output of said mixer means said mixer means having substantially zero output when said cylinder is being rotated at said constant angular velocity.

5. In an integrating accelerometer: a base member; a housing means; a float member; fluid means, said float member being suspended at a null position within said housing by said fluid means, the suspension of said float member within said housing means being characterized by permitting relative displacement therebetween; pump means including a threaded portion mounted within said housing member and adapted for rotation relative to said base member; means adapted to rotate said pump means; means responsive to relative displacement of said float and said housing so as to rotate said pump means and cause said threaded portion to pump said fluid means so as to force said float member towards said null position; and means for producing an output indicative of the angular velocity of said pump means.

References Cited in the file of this patent

UNITED STATES PATENTS

| | | |
|---|---|---|
| 1,840,001 | Tsujita | Jan. 5, 1932 |
| 2,319,940 | Marrison | May 25, 1943 |
| 2,819,053 | Pope | Jan. 7, 1958 |
| 2,840,366 | Wing | June 24, 1958 |
| 2,861,789 | Pope | Nov. 25, 1958 |
| 2,933,298 | Allison | Apr. 19, 1960 |
| 2,975,641 | Lees | Mar. 21, 1961 |
| 2,983,149 | Lees | May 9, 1961 |